United States Patent [19]

Kempter

[11] Patent Number: 4,589,694

[45] Date of Patent: May 20, 1986

[54] WATER DRAINING SYSTEM FOR FRAMES OF MOTOR VEHICLE SLIDING ROOFS AND SIMILAR DEVICES, AND A METHOD OF MAKING SAME

[75] Inventor: Michael Kempter, Munich, Fed. Rep. of Germany

[73] Assignee: Webasto-Werk W. Baier GmbH & Co., Fed. Rep. of Germany

[21] Appl. No.: 644,015

[22] Filed: Aug. 24, 1984

[30] Foreign Application Priority Data

Sep. 27, 1983 [DE] Fed. Rep. of Germany ....... 3334896

[51] Int. Cl.[4] .................................................. B60J 7/04
[52] U.S. Cl. ..................................... 296/213; 403/267; 29/157 R; 29/527.1
[58] Field of Search ............... 296/213, 216, 218, 221, 296/222; 285/284, 202, 203, 42; 403/267, 265, 266; 264/213, 279, 275, 271.1, 274; 29/157 R, 527.1; 4/288, 286

[56] References Cited

U.S. PATENT DOCUMENTS

| 2,991,120 | 7/1961 | Barenyi | 296/213 |
| 4,159,144 | 6/1979 | Ehlen | 296/216 |
| 4,355,843 | 10/1982 | Murakami | 296/213 |
| 4,386,802 | 6/1983 | Cunningham | 296/213 |
| 4,420,184 | 12/1983 | Kaltz | 296/222 |

FOREIGN PATENT DOCUMENTS 1605936 9/1971 Fed. Rep. of Germany .

Primary Examiner—Robert R. Song
Attorney, Agent, or Firm—Sixbey, Friedman & Leedom

[57] ABSTRACT

A water draining system for frames of motor vehicle sliding roofs, tiltout roofs and similar devices, having at least one water draining pipe consisting of plastic. The draining pipe is used for draining water from a gutter, formed by the frame and surrounding an opening in the roof at least on part of its circumference, via an aperture in the frame. The water drain pipe is directly molded onto the frame, and is especially injection molded on or vulcanized on.

16 Claims, 2 Drawing Figures

WATER DRAINING SYSTEM FOR FRAMES OF MOTOR VEHICLE SLIDING ROOFS AND SIMILAR DEVICES, AND A METHOD OF MAKING SAME

BACKGROUND AND SUMMARY OF THE INVENTION

This invention relates to a water draining system for frames of motor vehicle sliding roofs, tilt-out roofs and similar devices, having at least one water draining pipe, consisting of plastic, for draining water from a water groove formed by the frame and surrounding an opening in the roof on at least on its circumference, via an aperture in the frame.

In the case of a known water draining system of this type (U.S. Pat. No. 4,355,843), a pipe-shaped connecting piece fastened at the frame is run through the aperture in the frame. At its inside end, the connecting piece has a flange that projects radially to the outside, said flange resting against the periphery of the rain groove. The water draining pipe is fitted on the outside end of the connecting piece. In an undesirable manner, the mounting of this water draining system requires considerable manual work with high expenditures with respect to testing and control.

It is also known (DE-OS 16 05 936) to weld onto a water draining pipe, a shaped part made of a springy elastic material which is stuck through the aperture in the frame and in the process is clipped to the frame. However, the clipped connection is critical in regard to the tightness than can be achieved.

The invention, therefore, has an objective of creating a water drainage system that is reliably and durably sealed off in a manner that requires less manual work for mounting and does not require extensive measures for testing and control.

Based on the water draining system of the initially mentioned type, this objective, according to the invention, is achieved by the fact that the water draining pipe is molded directly onto the frame.

By means of the direct molding of the water draining pipe or pipes onto the frame, an absolutely tight connection is achieved that requires little work.

In order to improve its tightness and mechanical stability, the arrangement is preferably made in such a way that the material of the water drainage pipe reaches around the edge of the frame aperture on both sides thereof.

Advantageously, the water draining pipe can be injection-molded onto the frame or, when it consists of rubber, can be vulcanized onto the frame.

For a further increase of the stability of the connection between the frame and the water draining pipe, the aperture is, advantageously, provided with an essentially cylindrical, pipe-type section which points toward the outside and is embedded into the molded-on water draining pipe.

In a further development of the invention, the bottom surface of the water groove is depressed, in the area of the aperture, in such a way that the lowest part of the inside edge of the draining pipe is no higher than the level of the exposed bottom surface of the water groove. This ensures a perfect and complete emptying of the water groove. Preferably, in this case, the inside edge of the draining pipe, at least in the lower area of the water groove, is flush with the area of the frame defining the water groove.

These and further objects, features and advantages of the present invention will become more obvious from the following description when taken in connection with the accompanying drawings which show, for the purposes of illustration only, a single embodiment in accordance with the present invention.

DETAILED DESCRIPTION OF THE PREFERRED EMBODIMENT

Figure 1:
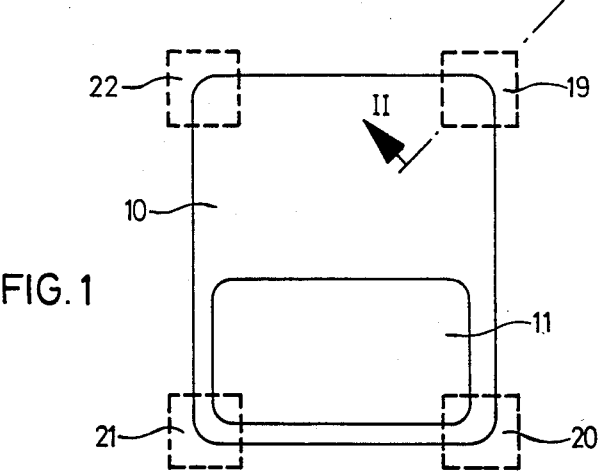
FIG. 1 is a diagrammatic top view of a frame of a sliding roof.

In FIG. 1, a frame 10 of a sliding roof is shown that defines an opening 11 in a roof. The frame 10 forms a water groove or gutter 12 (FIG. 2) that surrounds the opening 11 in the roof along at least a part of its circumference. At its four corners, the frame 10 is, in each case, provided with an aperture 13 for the draining of water from the gutter 12. The aperture has an essentially cylindrical, pipe-type section 14 projecting exteriorly away from the underside of the frame 10. In the area of the apertures 13, the frame 10 is depressed in the same manner shown in FIG. 2 at number 15. Water drain pipes 18, made of plastic or rubber, are molded directly onto the frame 10 of the sliding roof in the area of the apertures 13.

For molding of the drain pipes 18 onto the frame, four molds are positioned at the four corners of the sliding roof frame 10. The four molds may be carried jointly, in a conventional manner on a common mold support (not shown). The individual molds (indicated in broken lines in FIG. 1 by reference numerals 19, 20, 21 and 22) each include an upper mold part 23 and a lower mold part 24. The mold parts 23, 24 enclose the frame 10, at a respective corner, from above and from below, and they, together with a core part 25, define a mold cavity 26 of a shape corresponding to the shape of the water drain pipe 18.

The opening and the closing of the individual molds 19 to 22 takes place hydraulically in the direction of the double arrow 27 and the core part 25 moves in the direction of double arrow 28. After the closing of the molds, the core 25 is moved into each of the molds via a hydraulic cylinder 29. The core part 25 seals off the mold cavity 26 by being received in the upper part 23 of the mold and in the lower part 24 of the mold. An injection nozzle 30 is moved into engagement with a sprue hole in each mold. By means of the injection nozzle 30, the preplasticized and heated pipe material is injected. In a known manner, all four molds may be injected with material from a single injector via a runner having branch passages and four nozzles 30. After the hardening or the vulcanization of the plastic or rubber, the core part 25 is pulled out hydraulically, and the two halves 23, 24 of the mold are opened, after the injection nozzle 30 is removed (injection nozzle 30 moves in the direction of the double arrow 31).

Figure 2:
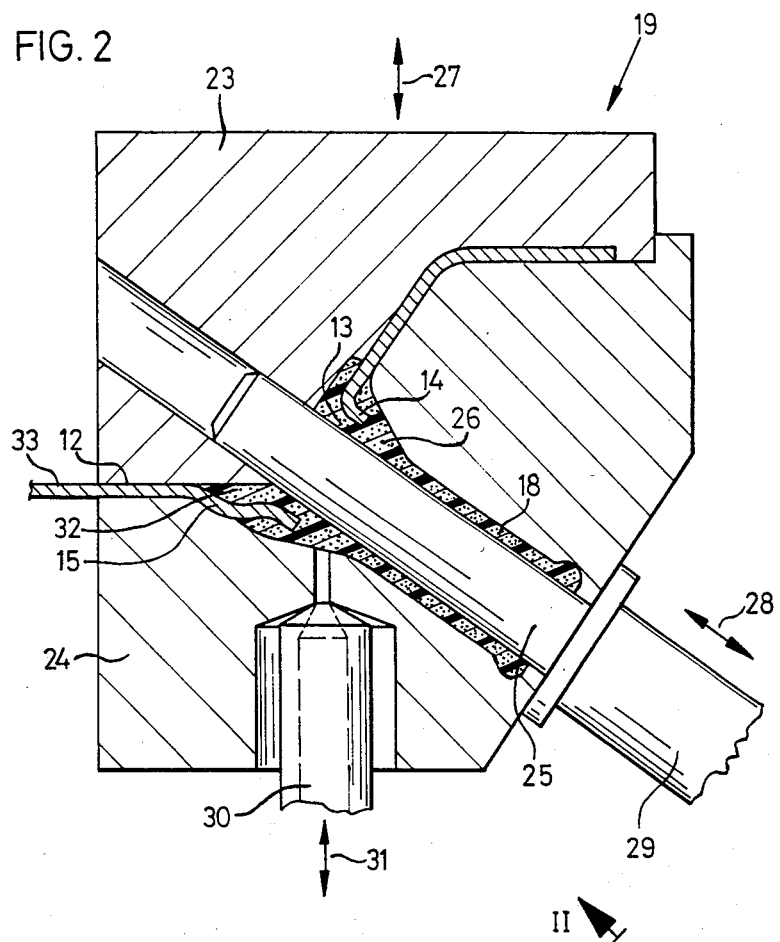
FIG. 2 is an enlarged sectional view corresponding to Line II—II of FIG. 1.

As shown in FIG. 2, the edge of the aperture 13 is surrounded by the material of the draining pipe 18 on both sides, i.e. top and bottom. The cylindrical pipe-type section 14 of the aperture 13 is embedded in the molded-on water draining pipe 18. The edge 32 of the draining pipe 18 situated inside gutter 12, at its lowest point within the depression 15, is located at approximately the same level as the lowest point 33 of the exposed bottom surface of the gutter 12, and in the illustrated embodiment, it is flush with the area of the frame defining the bottom of the gutter 12.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A water draining system for frames of motor vehicle sliding roofs, tiltout roofs and similar devices of the type having at least one water drain pipe for draining water from a gutter, formed by the frame and surrounding an opening in the roof at least on part of its circumference, via an aperture in the gutter of the frame, wherein the water drain pipe is molded directly onto the frame, and wherein the material of the water draining pipe surrounds an edge of the aperture on both inner and outer sides thereof.

2. A water draining system according to claim 1, wherein the water drain pipe is injection molded onto the edge of the aperture.

3. A water draining system according to claim 1, wherein the water drain pipe consists of a rubber and is vulcanized onto the edge of the aperture.

4. A water draining system according to claim 1 wherein the aperture is provided with an essentially cylindrical, pipe-shaped section that points exteriorly away from an underside of the frame and is embedded into the drain pipe.

5. A water draining system according to claim 4, wherein a bottom surface of the gutter in the area of the aperture, is depressed in such a way that the lowest point of an inside edge of the drain pipe is no higher than the lowest point of an exposed portion of the bottom surface of the gutter adjacent thereto.

6. A water draining system according to claim 5, wherein the inside edge of the drain pipe is, at least in the lower area of the gutter, flush with the area of the frame defining the bottom surface of the gutter.

7. A water draining system according to claim 5, wherein the water drain pipe is injection molded onto the edge of the aperture.

8. A water draining system according to claim 5, wherein the water drain pipe consists of a rubber and is vulcanized onto the edge of the aperture.

9. A water draining system according to claim 6, wherein the water drain pipe is injection molded onto the edge of the aperture.

10. A water draining system according to claim 6, wherein the water drain pipe consists of a rubber and is vulcanized onto the edge of the aperture.

11. A water draining system for frames of motor vehicle sliding roofs, tiltout roofs and similar devices of the type having at least one water drain pipe for draining water from a gutter, formed by the frame and surrounding an opening in the roof at least on part of its circumference, via an aperture in the gutter of the frame, wherein the water drain pipe is molded directly onto the frame, and wherein a bottom surface of the gutter, in the area of the aperture, is depressed in such a way that the lowest point of an inside edge of the drain pipe is no higher than the lowest point of an exposed portion of the bottom surface of the gutter.

12. A water draining system according to claim 11, wherein the inside edge of the drain pipe is, at least in the lower area of the gutter, flush with the area of the frame defining the bottom surface of the gutter.

13. A water draining system according to claim 12, wherein the water drain pipe is injection molded onto the edge of the aperture.

14. A water draining system according to claim 12, wherein the water drain pipe consists of a rubber and is vulcanized onto the edge of the aperture.

15. A water draining system according to claim 11, wherein the water drain pipe is injection molded onto the edge of the aperture.

16. A water draining system according to claim 11, wherein the water drain pipe consists of a rubber and is vulcanized onto the edge of the aperture.

* * * * *